United States Patent
Oetzmann (12)

(10) Patent No.: US 6,473,363 B1
(45) Date of Patent: Oct. 29, 2002

(54) SONAR DIRECTION FINDING

(75) Inventor: Emerson Hardy Oetzmann, Ashford (GB)

(73) Assignee: Thales Underwater Systems, Weybridge (GB)

( * ) Notice: Subject to any disclaimer, the term of this patent is extended or adjusted under 35 U.S.C. 154(b) by 0 days.

(21) Appl. No.: 07/578,528

(22) Filed: Aug. 20, 1990

(51) Int. Cl.$^7$ ................................................ G10S 3/80
(52) U.S. Cl. ........................ 367/120; 367/118; 367/125
(58) Field of Search ........................ 367/99, 120, 125, 367/118

(56) References Cited

U.S. PATENT DOCUMENTS

| | | | |
|---|---|---|---|
| 3,622,964 A | * 11/1971 | Leisterer et al. | ............ 367/120 |
| 3,763,465 A | * 10/1973 | Tatge et al. | ................. 367/125 |
| 3,870,989 A | * 3/1975 | Mellet | ......................... 367/125 |
| 4,198,705 A | * 4/1980 | Massa | ......................... 367/126 |
| 4,208,733 A | * 6/1980 | Orieux | ........................ 367/125 |
| 4,594,694 A | * 6/1986 | Tanaka et al. | .............. 367/120 |
| 4,800,541 A | * 1/1989 | Farmer et al. | .............. 367/125 |
| 4,955,003 A | * 9/1990 | Goldman | ..................... 367/125 |

* cited by examiner

Primary Examiner—Ian J. Lobo
(74) Attorney, Agent, or Firm—Kirschstein et al.

(57) ABSTRACT

A method of determining the bearing of a source of a sonar signal comprising determining the phase of a cyclic variation of the output signal of a sonar detector having a directional characteristic which occurs as the orientation of the detector, and hence its characteristic, is rotated. In a preferred method the sonar detector output is spectrum analysed at each of a plurality of different orientations of the detector to provide for each orientation a signal representative of the amplitude of a component of the signal produced by the source of a chosen frequency. The signals so obtained are then arranged to form a time series of samples of said component as the orientation of the detector is rotated at a predetermined frequency and the time series used to analyse the spectrum of the signal defined by the time series and thereby determine the phase of the sinusoidal component of the signal defined by the time series at the predetermined frequency. Apparatus for carrying out the method is also disclosed.

28 Claims, 3 Drawing Sheets

SONAR DIRECTION FINDING

BACKGROUND OF THE INVENTION

1. Field of the Invention

This invention relates to sonar direction finding.

More particularly the invention relates to methods and apparatus for determining the bearing of a source of a sonar signal.

2. Description of Related Art

Various methods and apparatuses are known for detecting the signals emitted by a sonar signal source and utilising them to determine the bearing of the source. Typically such methods involve the combination of the signals produced by two or more detectors which are differently orientated with respect to the sonar signal source, e.g. three detectors giving cardioid response characteristics at 120° angular spacing.

SUMMARY OF THE INVENTION

In general, such known methods require matching or knowledge of the directional characteristics of the detectors.

It is an object of the present invention to provide a method and apparatus for determining the bearing of a source of a sonar signal wherein this requirement is avoided.

According to a first aspect of the present invention there is provided a method of determining the bearing of a source of a sonar signal comprising determining the phase of a cyclic variation at a predetermined frequency of a chosen component of the output of a sonar detector monitoring said signal, said cyclic variation being due to rotation of the orientation of said detector with respect to the source at said predetermined frequency and said detector having a directional characteristic such that its output varies cyclically with the bearing of said source.

Preferably said phase is determined by separating from the output of said detector a component at said predetermined frequency and determining the phase of that component.

According to a second aspect of the present invention there is provided a method of determining the bearing of a source of a sonar signal comprising: monitoring the signal emitted by the source using a detector having a directional characteristic such that the amplitude of the signal produced by the detector varies with the bearing of the source; analysing the spectrum of the signal produced by the detector with the directional characteristic of the detector at a first orientation with respect to the source to obtain a signal representative of the amplitude of a chosen sinusoidal component of said signal produced by the detector; similarly obtaining signals representative of the amplitude of said component when the directional characteristic of the detector is at each of a plurality of further different orientations with respect to said source; arranging said signals representative of said amplitudes to form a time series of samples of the output of the detector relating to said component as the orientation of the detector is rotated at a predetermined frequency; and using said time series of samples to analyse the spectrum of the signal defined by said time series of samples and thereby determine the phase of a sinusoidal component thereof of a frequency determined by said rotation of the detector.

According to a third aspect of the invention there is provided an apparatus for determining the bearing direction of a source of a sonar signal comprising: a sonar signal detector having a directional characteristic such that the amplitude of the output of the detector varies with the bearing of the source; first processing means for deriving from the output of the detector a signal representing the amplitude of a chosen sinusoidal component of the output of the detector; means for positioning the directional characteristic of the detector at each of a plurality of orientations with respect to said source; and second processing means for processing the signals produced by said first processing means at each orientation of the detector as a time series of samples of the output of the detector at the frequency of said component as the orientation of the detector is rotated at a predetermined frequency, thereby to determine the phase of a sinusoidal component of the signal defined by said time series of a frequency determined by said rotation of the detector.

In a preferred apparatus according to the invention said first and second processing means are one and the same processing means.

BRIEF DESCRIPTION OF THE DRAWINGS

One method and apparatus in accordance with the invention will now be described by way of example with reference to the accompanying drawings in which.

DETAILED DESCRIPTION OF THE PREFERRED EMBODIMENTS

Figure 1:
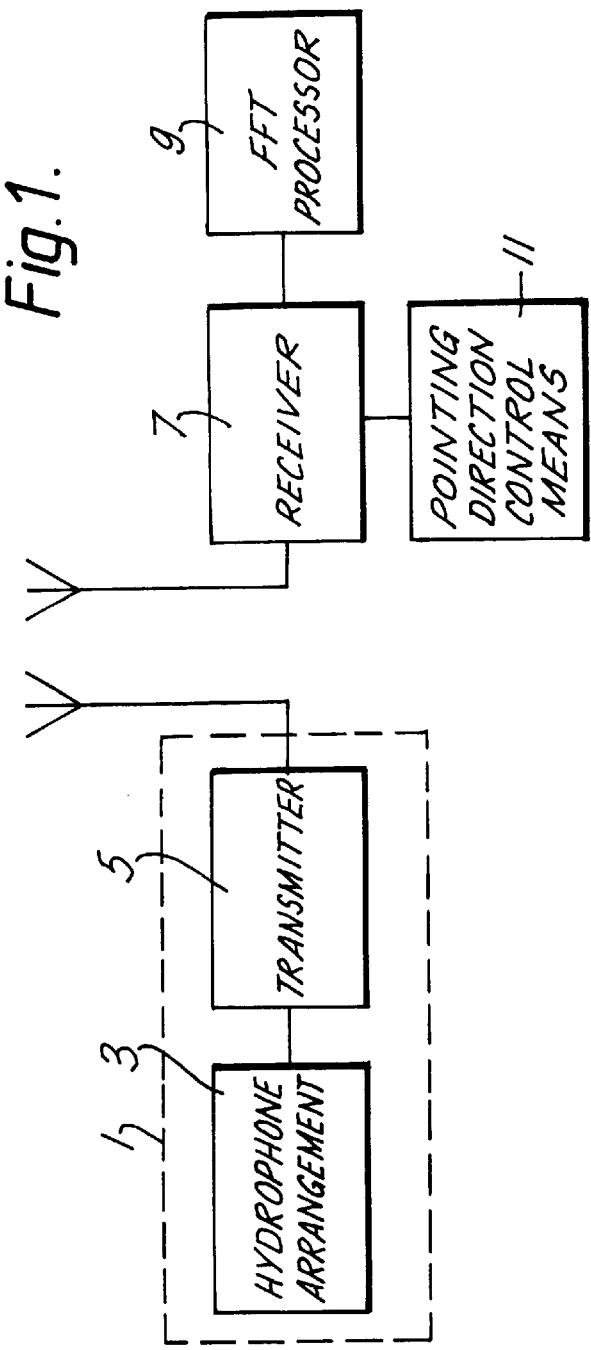
FIG. 1 is a block schematic diagram of the apparatus.

Referring to FIG. 1, the apparatus comprises a sonobuoy 1 carrying a hydrophone arrangement 3 for producing electrical signals representative of detected underwater acoustic signals. The sonobuoy 1 also includes a radio transmitter 5 by means of which the output signals of the hydrophone arrangement 3 are transmitted to a receiver 7 associated with a fast Fourier transform (FFT) processor 9 wherein they are processed to obtain an indication of the bearing of the source of the detected acoustic signals.

Figure 2:
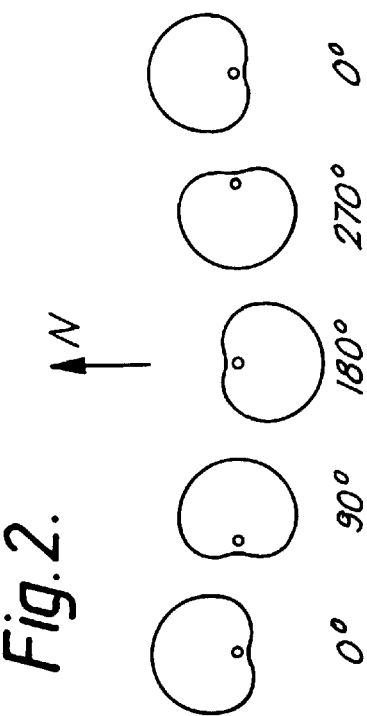
FIG. 2 shows the polar diagram of a hydrophone arrangement used in the method and apparatus at various orientations.
Figure 3:
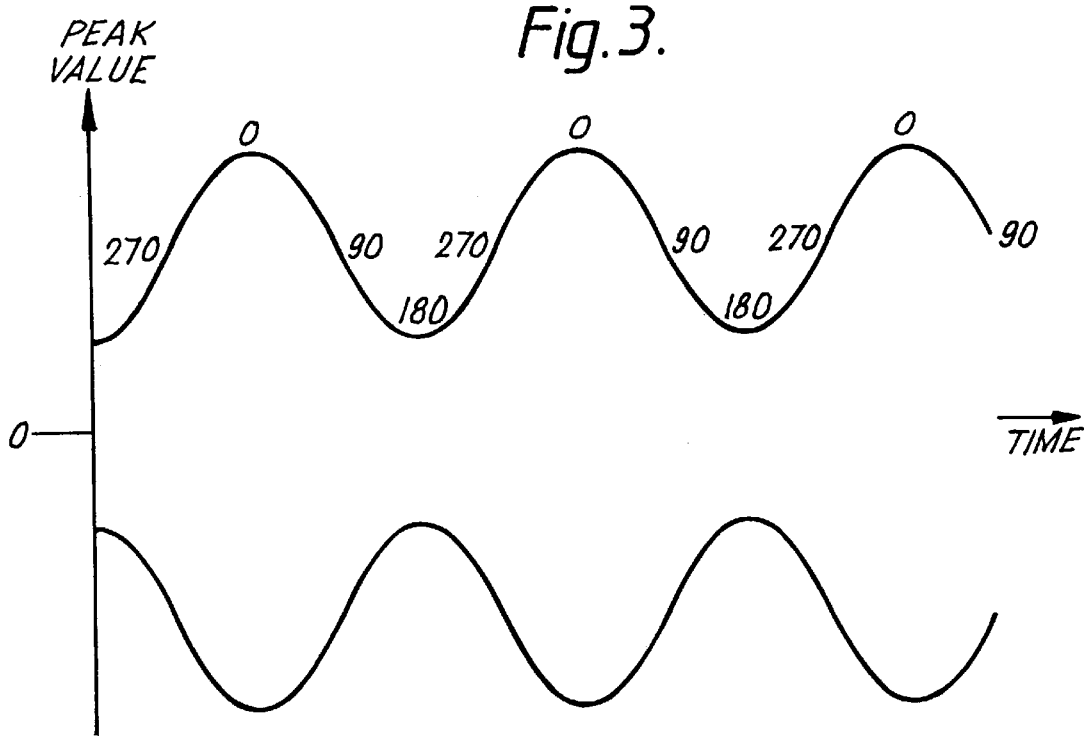
FIG. 3 illustrates the variation of the amplitude of a signal detected by the hydrophone arrangement as the hydrophone arrangement pointing direction is rotated.

The hydrophone arrangement 3 has a directional characteristic defined by the expression $k+\cos\theta$ where $k \geq 1$ and $\theta$ is the angle of the direction of the source with respect to the maximum sensitivity direction of the hydrophone arrangement. Thus the arrangement has a so-called cardioid shape where $k=1$, or a so-called limacon shape where $k>1$, as illustrated in FIG. 2. Thus, with a sonar signal of fixed amplitude and fixed bearing of due North the output of the arrangement varies sinusoidally, as shown in FIG. 3, as the maximum sensitivity direction of the arrangement is rotated, as illustrated in FIG. 2.

In the apparatus the directional characteristic of the hydrophone arrangement is arranged to be steerable through 360°. This may in theory be achieved mechanically but is preferably achieved electronically by appropriate control by control means 11 of the processing of the detected acoustic signals in the receiver 7, as described in United Kingdom patent application No. 8322770.

The manner in which the apparatus is operated to determine the bearing of the source of the acoustic signals will now be described.

The apparatus is first operated with the maximum sensitivity direction of the hydrophone arrangement 3 pointing in a predetermined direction e.g. due west. With this position held the detected acoustic signal is repeatedly sampled in the receiver 7 and the samples obtained digitised and subjected to spectral analysis using the FFT processor 9 in known manner. By this means the amplitude of the sinusoidal components of the detected acoustic signals in each of a number of contiguous equal bandwidth cells is determined. A target signal is then selected, typically the sinusoidal component of greatest amplitude, and the amplitude of the target signal is stored.

Figure 4:
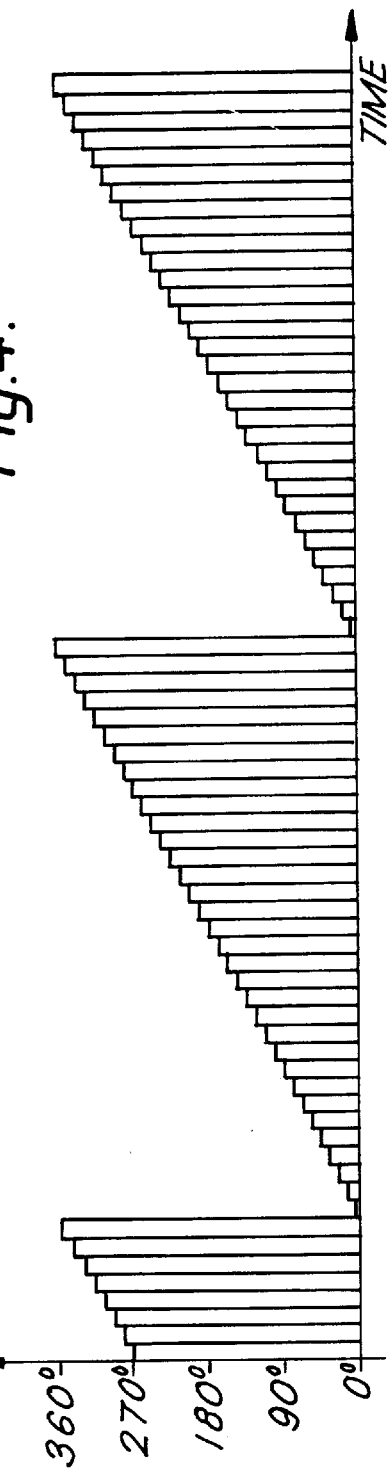
FIG. 4 is a diagram illustrating how the hydrophone arrangement pointing direction is varied during the method.
Figure 5:
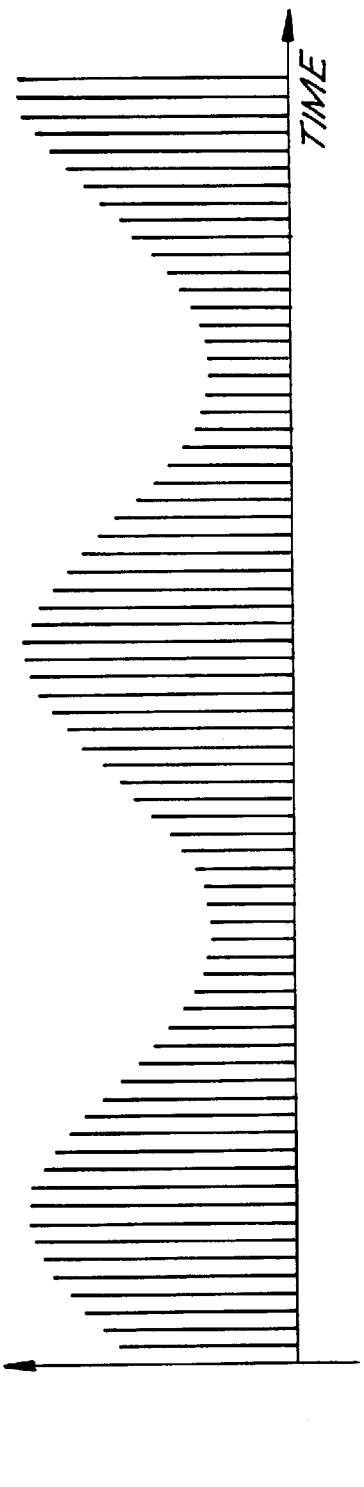
FIG. 5 is a diagram illustrating the signals collected for use in a fast Fourier transform processing step of the method.

The above process is then repeated as the pointing direction of the hydrophone arrangement is progressively changed at equal time intervals in regular manner in steps of equal magnitude, as illustrated in FIG. 4, and the amplitude of the target signal detected for each direction is stored, as illustrated in FIG. 5 for a source due North of the hydrophone arrangement. Typically the pointing direction is rotated through three complete revolutions in 32 steps per revolution giving 96 stored values of the target signal amplitude.

Due to the shape of the directional characteristic of the hydrophone arrangement 3 the stored values of the target signal amplitude vary sinusoidally with rotation of the pointing direction of the arrangement 3, as illustrated in FIG. 5. The phase of this modulation envelope of the stored values indicates the bearing of the source of the acoustic signals.

The values of target signal amplitude obtained and stored during rotation of the hydrophone arrangement pointing direction form a time series of samples of the envelope of the modulation of the detected target signal due to rotation of the hydrophone arrangement pointing direction. These stored values are utilised by the FFT processor 9 to perform a second tier of FFT processing and obtain an output representative of the sinusoidal component of the modulation envelope due to the hydrophone arrangement rotation, the phase of this output indicating the bearing of the detected target signals. It will be understood that the variation of the amplitude of the component of the modulation envelope due to hydrophone arrangement rotation is necessarily sinusoidal as a consequence of the shape of the hydrophone arrangement directional characteristic.

It will be appreciated that measuring the phase of the output produced by the second tier FFT processing of the stored amplitude samples obtained by the first tier FFT processing of the samples of the detected acoustic signals to obtain an indication of bearing provides an improved signal to noise ratio (SNR) over obtaining an indication of bearing by direct measurement of the phase of the samples obtained by FFT processing of the samples of the detected acoustic signals. It will be understood in this connection that whilst the modulation envelopes are shown in FIGS. 3 and 5 as being sinusoidal, in practice these modulation envelopes will be far from sinusoidal due to the presence of noise.

The reason for the improved SNR obtained by the second tier of FFT processing is that the noise in any particular cell of the first FFT processing is random in amplitude as a function of time. Consequently, the samples used as the input time series for the second tier FFT processing contain random noise in addition to the sinusoidal component of the modulation envelope due to hydrophone rotation which is to be detected by the second tier FFT processing. Since this noise component is random the noise power is spread equally among all the frequency cells output by the second tier FFT processing. Hence there is a signal processing gain proportional to the square root of the number of samples. If the 96 samples obtained by the first tier FFT processing were used directly to obtain the phase of the modulation envelope and hence bearing, a lower signal processing gain would be obtained. Thus by using a second tier of FFT processing an increase in signal processing gain is obtained. In a typical particular system this increase is about 7 dB.

In a typical system the FFT processing time for each bearing of the hydrophone arrangement 3 is about 310 ms so that FFT processing for ninety-six bearings takes about 30 seconds. Thus, the frequency of the sinusoidal component whose phase is determined in the second tier FFT processing is typically 0.1 Hz.

It will be appreciated that in other methods and apparatus according to the invention the second tier FFT processing may be carried out for other than 32 samples per revolution of hydrophone pointing direction and for other than three revolutions of hydrophone pointing direction. However, in general 32 samples per revolution and three revolutions are the minimum necessary to obtain a satisfactory indication of bearing direction.

In a modification of the method and apparatus described by way of example a hydrophone arrangement exhibiting a multiple cardioid directional characteristic may be used, e.g. an arrangement comprising three hydrophones respectively exhibiting cardioid directional characteristics whose maximum sensitivity directions are at 120° spacings so that the arrangement as a whole exhibits a clover leaf shaped characteristic but with each hydrophone providing a separate output. By rotating the three hydrophones in unison FFT data for a whole revolution can be collected in one third of the time taken using an arrangement having a single cardioid characteristic. However a slight reduction in SNR improvement may be expected if there is correlation between the noise in the cardioids. Furthermore, if the cardioids are of slightly different shape some harmonic distortion may result. This effect can however be minimised by rotating the three cardioids between taking of samples for the first tier FFT processing by 120° plus the required step interval, i.e. 360/32, or by using some other repositioning sequence which effectively mixes the signals from the different cardioids. It will be appreciated in this connection that the hydrophone arrangement in a method or system in accordance with the invention need not be rotated in regular steps. A random step pattern may be used provided the samples obtained are properly unscrambled to form the desired series of samples before the second tier FFT processing is carried out. A random sequence may help to reduce any correlated noise which is present.

It will be understood that in a method and apparatus according to the invention data in respect of two or more target signals of different frequencies may be obtained during first tier FFT processing. Where it may be assumed that these different frequency signals arise from one and the same target, the amplitudes obtained for the different target signals by the first tier FFT processing for each hydrophone pointing direction may be added together to give a sum value for use as an input for the second stage FFT processing. Alternatively the amplitudes for the different target signals may be stored separately and concatenated to increase the length of the time series used as input for the second tier FFT processing by a factor equal to the number of different signals. This may give a greater increase in processing gain than summing the different signals as described above. However, with concatenation problems may arise if the amplitudes of the signals for different target signal frequencies are very different. This difficulty may, however, be alleviated by randomly interchanging in the concatenation the amplitudes for the different target signals relating to the same hydrophone pointing direction.

The signals for different frequencies may of course be processed separately to see if they relate to sources of the same or different bearing.

Where it is not possible or not desired to identify a target signal or signals, the data in all the cells of the first tier FFT processing in a frequency band likely to be of interest may be summed together to form a single value, and these single values used as inputs for the second tier FFT processing. All cells of the first tier FFT processing will contain noise emanating from a target and will therefore contain signals whose amplitudes fluctuate together in a sinusoidal manner with hydrophone pointing direction rotation, and this will be detected by the second tier FFT processing in the same manner as for a particular target signal of particular frequency. Thus the second tier FFT processing provides an output at the rotation frequency of the hydrophone arrangement whose phase indicates target bearing.

For lower frequency detected acoustic signals e.g. 10 to 20 Hz the cell signals may, instead of being summed, be stored individually and concatenated to give a longer FFT time series and a consequently greater SNR improvement than can be obtained by summing. At higher frequencies where an octave contains more FFT cells concatenation becomes impractical. However, a combination of summing sub-octave groups concatenated together to cover a complete octave may be used.

If two targets at different bearings are present when using the above described band processing technique, a second harmonic term will be generated in the second tier FFT processing which can be used to calculate the bearings of both targets. This can, for example, be achieved by subjecting the second tier FFT processing cell signals relating to the harmonic term to inverse FFT processing to obtain a time series of signals whose peaks indicate the target bearings.

It will be appreciated that in a method and apparatus according to the invention FFT processing may be carried out to produce power data, i.e. (amplitude)$^2$ data, or voltage data, i.e. amplitude or root power data. However, power data can be used as the second tier FFT input time series only if proper account is taken of the implications.

If the hydrophone arrangement beam shape is defined by the expression $k+\cos\theta$ and power data is used for the second tier FFT input, the effective beam shape becomes $$k^2 + 2k\cos\theta + \cos^2\theta$$

i.e.

$$\tfrac{1}{2}\cos 2\theta + 2k\cos\theta + (k^2 + \tfrac{1}{2})$$

and the fundamental term $2k\cos\theta$ can be used for bearing determination in accordance with the present invention. The second harmonic term $\tfrac{1}{2}\cos 2\theta$ arises due to the fact that the system is non-linear due to the use of power data. This term can also be used for target bearing direction estimation but will of course give rise to ambiguity between two directions 180° apart, as is the case with any direction finding system having a dipole directional characteristic.

The presence of a second harmonic term with a single target when using power data will of course complicate the use of the second harmonic term to detect the presence of more than one target in the band processing technique described above.

Using power data for the second tier FFT processing input in a method and apparatus according to the invention enables the value k to be determined for a cardioid hydrophone arrangement used in a method or apparatus. Thus, if power data is used in the second tier FFT processing the time series of the modulation envelope will be of the form:

$$\tfrac{1}{2}\cos 2wt + 2k\cos wt + (k^2 + \tfrac{1}{2})$$

where w is the angular frequency of the hydrophone arrangement rotation. Hence k is given by the expression $$4k = \frac{\text{Fundamental amplitude}}{\text{second harmonic amplitude}}$$

Figure 6:
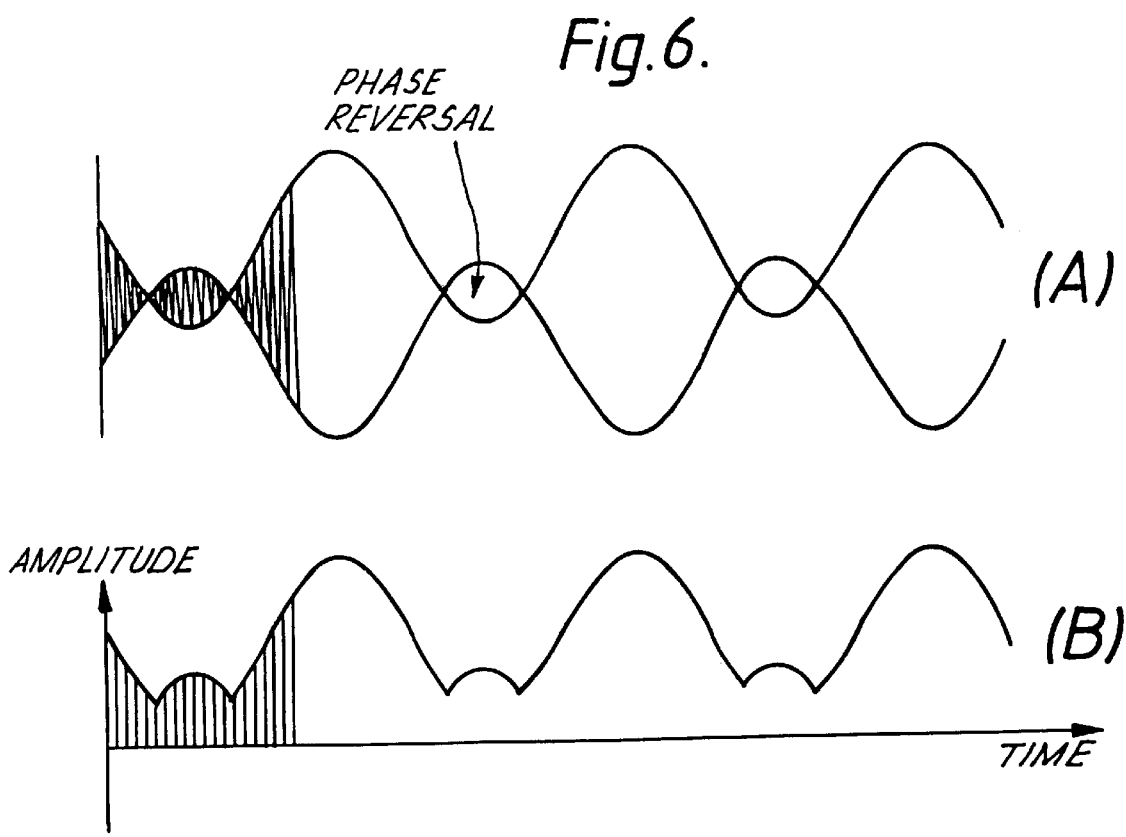
FIGS. 6A and 6B are diagrams corresponding to FIGS. 3 and 5 for a hydrophone arrangement of a particular kind.

It will be noted in this connection that, for a cardioid in which k<1, the use of voltage data causes abrupt discontinuities in the envelope of the time series input to the second tier FFT processing. This is, of course, equivalent to amplitude modulation over-modulation and is illustrated in FIG. 6 where FIG. 6A shows the waveform of the signal detected by the hydrophone arrangement as its pointing direction rotates and FIG. 6B shows the consequent time series input to the second tier FFT processing.

It is pointed out that in the method and apparatus described above by way of example the hydrophone arrangement does not necessarily have a cardioid shape directional characteristic, but may have a characteristic of any shape which gives an output which varies sinusoidally with target bearing. Thus a hydrophone arrangement having a dipole directional characteristic instead of a cardioid directional characteristic may be used. Bearing may then be determined using the identity:

$$\cos^2\theta - \sin^2\theta = \cos 2\theta$$

For example, using a hydrophone arrangement comprising two orthogonal dipoles, the power data obtained from the first tier FFT processing of the samples of the output of one dipole is subtracted from the corresponding data obtained for the other dipole to give a time series for $\cos^2 wt - \sin^2 wt$. This series is then used as input for the second tier FFT processing to obtain an indication of bearing from the phase of the $\cos 2\theta$ component. It will be appreciated that, as with all dipole characteristic direction finding systems, there will again be 180° ambiguity in bearing direction.

An advantage of the $\cos^2 wt - \sin^2 wt$ relationship is that isotropic ambient noise is self-cancelling by virtue of the subtraction and there is no DC term to cause scaling problems. Also, the ability to use power data directly reduces computing load.

More generally, a method and apparatus according to the present invention can use any sonar detector whose output includes a component which varies cyclically with target bearing, i.e. any sonar detector except one having an omni-directional characteristic. If the detector characteristic is non-symmetrical then a component at the fundamental of the detector rotation frequency is present and can be used to determine bearing. If the characteristic exhibits symmetries then harmonic components arise which can be used e.g. as described above for a dipole characteristic detector where the second harmonic component is used.

I claim:

1. A method of determining the bearing of a source of a sonar signal comprising the steps of: monitoring the sonar signal emitted by the source by using a detector having a directional characteristic oriented at an orientation relative to the source, said detector having an output that has an amplitude which varies with the bearing of the source from the detector; rotating the orientation of the detector at a predetermined frequency so that the output of the detector has a cyclic variation of the predetermined frequency, said cyclic variation having a phase; and determining the phase of the cyclic variation of a selected frequency component of the output of the detector, said phase indicating the bearing of the source.

2. A method according to claim 1, wherein the step of determining the phase of the cyclic variation comprises separating from the output of the detector a component of the predetermined frequency, and determining the phase of the component of the predetermined frequency.

3. A method according to claim 1 wherein said detector has a cardioid shape directional characteristic.

4. A method according to claim 3 wherein said detector has a directional characteristic in the form of at least two cardioids whose maximum sensitivity directions are equally angularly spaced.

5. A method according to claim 1 wherein said detector has a dipole shape directional characteristic.

6. A method according to claim 5 wherein said detector has a directional characteristic in the form of two dipole directional characteristics whose maximum sensitivity directions are orthogonal to one another.

7. A method according to claim 1 wherein said selected frequency component comprises at least two sinusoidal signals of different frequencies.

8. A method according to claim 1 wherein said selected frequency component comprises sinusoidal signals in a band of frequencies.

9. A method according to claim 1 wherein said selected frequency component is a voltage data component.

10. A method according to claim 1 wherein said selected frequency component is a power data component.

11. A method of determining the bearing of a source of a sonar signal comprising the steps of: monitoring the sonar signal emitted by the source by using a detector having a directional characteristic, said detector having an output that has a spectrum and an amplitude which varies with the bearing of the source from the detector; analyzing the spectrum of the output of the detector with the directional characteristic of the detector at a first orientation with respect to the source to obtain an amplitude signal representative of the amplitude of a selected sinusoidal frequency component of the output of the detector; similarly obtaining a further amplitude signal representative of each amplitude of said component when the directional characteristic of the detector is at each of a plurality of further different orientations with respect to the source; arranging the amplitude signals representative of said amplitudes to form a sample signal comprised of a time series of samples of the output of the detector relating to said component by rotating the orientation of the detector at a predetermined frequency, said sample signal having a spectrum; using said time series of samples to analyze the spectrum of the sample signal; and determining the phase of a selected frequency of the sample signal, said phase indicating the bearing of the source.

12. A method according to claim 11 wherein said detector is positioned in said different orientations by rotating said detector in steps of substantially equal angular magnitude at substantially equal time intervals.

13. A method according to claim 11 wherein said time series is in respect of at least three revolutions of said detector orientation.

14. A method according to claim 13 wherein said time series comprises at least thirty-two samples per revolution of said detector orientation.

15. A method according to claim 11 wherein said detector has a directional characteristic in the form of at least two cardioids whose maximum sensitivity directions are equally angularly spaced; and said detector is positioned in said different orientations by rotating said detector in steps of substantially equal angular magnitude equal to the angular spacing between maximum sensitivity directions plus an incremental rotation angle.

16. A method according to claim 11 wherein said selected frequency component comprises at least two sinusoidal signals of different frequencies and the amplitude signals representative of the amplitudes of said sinusoidal signals of different frequencies for each orientation of said detector are added together to form said time series of samples.

17. A method according to claim 11 wherein said selected frequency component comprises at least two sinusoidal signals of different frequencies and the amplitude signals representative of the amplitudes of said sinusoidal signals of different frequencies are concatenated to form said time series of samples.

18. A method according to claim 11 wherein said selected frequency component is a power data component and said detector has a directional characteristic of the form $k+\cos\theta$, where k is a constant and $\theta$ is the angle of the direction of the source with respect to the maximum sensitivity direction of said detector, the method further including obtaining an indication of the value of k by determining the ratio of the amplitudes of said sinusoidal components and the component of said time series of samples at twice the frequency of said sinusoidal component.

19. A method according to claim 11 wherein said detector has a cardioid shape directional characteristic.

20. A method according to claim 11 wherein said detector has a dipole shape directional characteristic.

21. A method according to claim 11 wherein said selected frequency component comprises at least two sinusoidal signals of different frequencies.

22. A method according to claim 11 wherein said selected frequency component comprises sinusoidal signals in a band of frequencies.

23. A method according to claim 11 wherein said selected frequency component is a voltage data component.

24. A method according to claim 11 wherein said selected frequency component is a power data component.

25. An apparatus for determining the bearing of a source of a sonar signal comprising: a sonar signal detector having a directional characteristic, and an output having an amplitude that varies with the bearing of the source from the detector; first processing means for deriving from the output of the detector an amplitude signal representing the amplitude of a selected sinusoidal frequency component of the output of the detector at each of a plurality of orientations with respect to the source; and second processing means for processing each amplitude signal produced by the first processing means at each orientation of the detector as a time series of samples of the output of the detector at the frequency of said selected sinusoidal frequency component as the orientation of the detector is rotated at a predetermined frequency, thereby to determine the phase of a sinusoidal component of a sample signal defined by said time series of a frequency determined by said rotation of the detector, said phase indicating the bearing of the source.

26. An apparatus according to claim 25 wherein said first and second processing means are one and the same processing means.

27. An apparatus according to claim 26 wherein said processing means comprise fast Fourier transform processing means.

28. An apparatus according to claim 25; and further comprises means for steering the directional characteristic electronically.

* * * * *